J. S. FRENCH.
Driving-Wheels for Locomotives.

No. 148,439. Patented March 10, 1874.

Witnesses.

Inventor
Jas. S. French.
by his Attys.

UNITED STATES PATENT OFFICE.

JAMES S. FRENCH, OF ALEXANDRIA, VIRGINIA.

IMPROVEMENT IN DRIVING-WHEELS FOR LOCOMOTIVES.

Specification forming part of Letters Patent No. 148,439, dated March 10, 1874; application filed October 24, 1871.

*To all whom it may concern:*

Be it known that I, JAMES S. FRENCH, of the city and county of Alexandria, and State of Virginia, have invented certain Improvements in the Construction of Driving-Wheels for Locomotive-Engines for Railroads, of which the following is a specification:

This invention relates particularly to two inventions heretofore made by me, on this subject, one of which was patented April 19, 1870, No. 102,107, on improvement in the driving-wheels of locomotive-engines, the other for an improvement in the running-gear of locomotives, patented November 4, 1873, No. 144,271.

This third application is for additional improvements to enable me to make more perfect the inventions above named.

In the first patent referred to, the main feature of the invention was the application of the driving-wheels of locomotives, formed with a wedge-shaped groove in each, to the rails of the railroad-tracks as now used. The wheel patented in this case was provided simply with a groove in the center of its tread, and an engine with these wheels was designed chiefly for new roads, when the frogs and crossings would be so constructed as to admit of the free passage of these wheels, in doing which there is no difficulty.

To adapt the invention to the roads as now constructed, without altering the frogs and crossings, was the object of the second patent. In this the same form of wheel was preserved as shown in the first patent, but differed from the first in being adapted to be raised or depressed at the will of the engineer.

In this third application the grooved wheels are adapted to the railroads with the frogs and crossings as they now exist, without rendering necessary any alteration in them, and without being compelled to lift the grooved driving-wheels out of the way in running over them.

Figure 1:
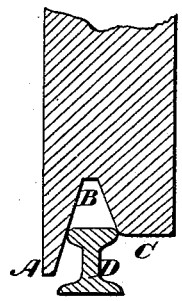
Figure 2:
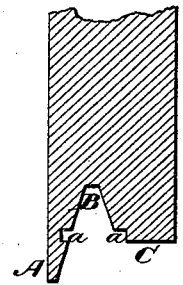
Figure 3:
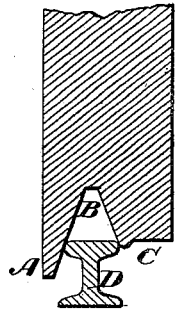

To effect this, I construct the driving-wheel with a wedge-shaped groove in the tread of the wheel, as shown in Fig. 1. Here the wheel has on the inside of the tread the common flange; next to this flange is the wedge-shaped groove, and the outer edge of the groove has no flange; but the edge is rounded and the tread of the wheel is even with the mouth of the groove. It is, in fact, shaped as the common driving-wheel would be, with a wedge-shaped groove formed in it next to the flange.

A is the common flange; B, the wedge-shaped groove; and C, the tread of the wheel outside the groove. The rail D is griped by the two sides of the groove just at its mouth, as shown in Fig. 1, and the tread of the wheel is on a line with the points where the wheel gripes the edges of the top of the rail. It will be apparent that this form of wheel, although having the wedge-shaped groove in its tire or tread, will pass freely over the frogs and crossings without there being any necessity for lifting them above the rails or over the frogs and crossings as now constructed. The outer edge of the groove being rounded off to the tread of the wheel, enables the wheel to accommodate itself to any varying width of the track, for it will run upon the tread when the track has spread, and settle back on the groove at the regular width. The tires of the drivings-wheels of locomotives are now made separate from the wheel, and are capable of being removed and replaced with new tires when worn; so may also the grooved tires be. Actual practice, or the daily working of these wheels, will alone show to what extent they will wear. The wear will be little, if any, on the rails, but mainly on the wheels, and at those points where the sides of the groove gripe the edges of the rails. Should these grooved tires wear away rapidly, I form the tires with a dovetailed or other formed recess, *a*, in each side of the groove, just at the point where the groove gripes the rail. This recess may be some inch or more wide, and about an inch deep, and be filled with steel or other material, so that when worn it may be readily removed and replaced. To fill it, I make the steel or other material in two or more sections, bent so as to fit in the recess, and secure the same with screws or otherwise.

I claim for this invention no particular form of rail, for it is applicable to all the rails now in general use. If rails are to be made for a new road, then the top of the rail may, if thought best, be made wedge-shaped to fit the mouth of groove.

It is obvious, however, that the wheels will wear much faster than the rails, for in running over a road every part of the tread of the wheels must come in contact with the rails with each revolution of the wheels, while these same wheels will come in contact with the rails only once in passing over them.

The great advantage claimed for this invention is that, in building locomotive-engines, they may be made much lighter than they now are, and yet more efficient. This invention renders unnecessary the great weight of the engine now so destructive to the roads, and causing such constant repairs, and reduces the dead weight of machinery hauled over them.

The principle of the wedge, applied to the driving-wheels of locomotives in combination with the railroad track or rails, overcomes these difficulties by substituting mechanical adhesion in part for weight. There is no doubt but that the wedge-shaped groove may be made to pinch the rails to any extent desired. The more acute the angle of the grooves the more it will pinch; the more obtuse the angle the less it will pinch.

An engine with wheels so constructed cannot slip, and hence will always work up to its steam power, will ascend any grade, and draw any load, as long as it has power to turn its wheels. Inasmuch as the locomotive-engine on this plan will not slip its wheels, it can exert the same power as if it were a stationary one, and the great advantage of this is manifest from the fact that incline planes too steep to be worked by locomotive engines are readily worked by small stationary engines. I propose to connect the grooved wheels by a divided axle, so constructed as to allow the wheels to have lateral play, and accommodate themselves to the varying widths of the track, or so that each wheel shall have a vertical play independent of the other, and be raised and lowered singly, or both together, for the reason that, in practice, one wheel pressed down on the rails will probably produce as much adhesion as the engine may require, and if so, can be used advantageously on curves, and throughout the line.

I claim as my invention—

1. A car-wheel, having a flange, A, and flat tread C, with a groove, B, between them to fit an ordinary rail, so that the wheel can change its bearings from the groove B to the tread C, and vice versa, as circumstances may require, substantially as described, for the purposes specified.

2. A driving-wheel, having groove B, and the side recesses $a$ $a$, substantially as and for the purposes specified.

JAMES S. FRENCH.

Witnesses:
N. K. ELLSWORTH,
C. F. BROWN.